(12) United States Patent
Pütz et al.

(10) Patent No.: US 12,485,744 B2
(45) Date of Patent: Dec. 2, 2025

(54) AIR GUIDANCE CONTROL UNIT FOR A MOTOR VEHICLE

(71) Applicant: MONTAPLAST GESELLSCHAFT MIT BESCHRÄNKTER HAFTUNG, Morsbach (DE)

(72) Inventors: Andreas Pütz, Much (DE); Andreas Ewert, Waldbröl (DE); Sebastian Schwegmann, Lohmar (DE); Johannes Müller, Waldbröl (DE); Frank Mika, Nümbrecht (DE)

(73) Assignee: MONTAPLAST GMBH, Morsbach (DE)

( * ) Notice: Subject to any disclaimer, the term of this patent is extended or adjusted under 35 U.S.C. 154(b) by 308 days.

(21) Appl. No.: 18/029,868

(22) PCT Filed: Oct. 4, 2021

(86) PCT No.: PCT/EP2021/077292
§ 371 (c)(1),
(2) Date: Mar. 31, 2023

(87) PCT Pub. No.: WO2022/069766
PCT Pub. Date: Apr. 7, 2022

(65) Prior Publication Data
US 2024/0123816 A1    Apr. 18, 2024

(30) Foreign Application Priority Data
Oct. 2, 2020 (DE) ............. 10 2020 125 891.7

(51) Int. Cl.
*B60K 11/08* (2006.01)

(52) U.S. Cl.
CPC .................. *B60K 11/085* (2013.01)

(58) Field of Classification Search
CPC ........................................ B60K 11/085
(Continued)

(56) References Cited

U.S. PATENT DOCUMENTS 8,312,676 B2 * 11/2012 Maciulewicz .......... E06B 7/086
40/493
8,550,887 B2 * 10/2013 Walters ..................... F01P 7/10
454/155
(Continued)

FOREIGN PATENT DOCUMENTS

| CN | 107160997 A | 9/2017 |
|---|---|---|
| CN | 109969113 A | 7/2019 |

(Continued)

OTHER PUBLICATIONS

Int'l Search Report issued Jun. 9, 2022 in Int'l Application No. PCT/EP2021/077292.
(Continued)

*Primary Examiner* — Hau V Phan
(74) *Attorney, Agent, or Firm* — Panitch Schwarze Belisario & Nadel LLP

(57) ABSTRACT

An air guidance control unit having a frame, which surrounds at least one air opening for air flowing along an air flow direction to flow through, a closing device including adjustable flaps, which closing device can be adjusted by means of an adjusting element between an open position in which the air opening is exposed and a closed position in which the air opening is at least partly closed. The invention devises various solutions for especially compact and reliable flap arrangements.

9 Claims, 5 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 8,646,552 | B2* | 2/2014 | Evans | .................... B60R 19/12 |
| | | | | 180/68.1 |
| 8,915,320 | B2* | 12/2014 | Chinta | ................. B60K 11/085 |
| | | | | 180/68.1 |
| 9,827,847 | B1 | 11/2017 | Hanna et al. | |
| 10,017,048 | B2* | 7/2018 | Manhire | ................ B60R 19/52 |
| 10,202,049 | B2 | 2/2019 | Nagaosa | |
| 10,391,557 | B2* | 8/2019 | Faust | ...................... B32B 15/01 |
| 10,391,855 | B2* | 8/2019 | Brueckner | ................ F01P 7/10 |
| 10,647,194 | B1* | 5/2020 | Burtch | ................. B60K 11/085 |

FOREIGN PATENT DOCUMENTS

| | | | |
|---|---|---|---|
| CN | 209479413 | U | 10/2019 |
| DE | 202011050032 | U1 | 7/2011 |
| DE | 102014104041 | A1 | 9/2015 |
| DE | 102018124572 | A1 | 4/2020 |
| DE | 102018218570 | A1 | 4/2020 |
| WO | 2012047528 | A2 | 4/2012 |

OTHER PUBLICATIONS

Int'l Preliminary Report on Patentability mailed Apr. 6, 2023 in Int'l Application No. PCT/EP2021/077292.

* cited by examiner

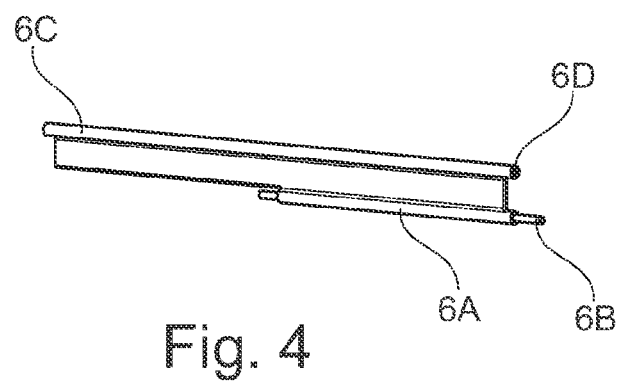
Fig. 4
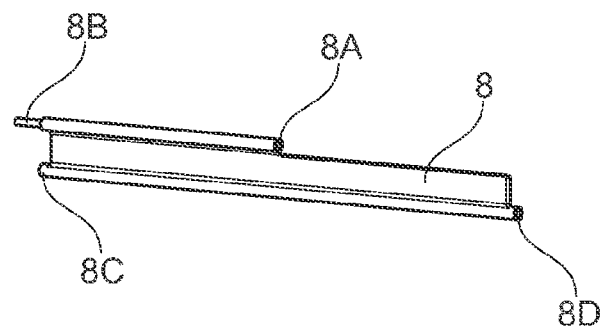
Fig. 5
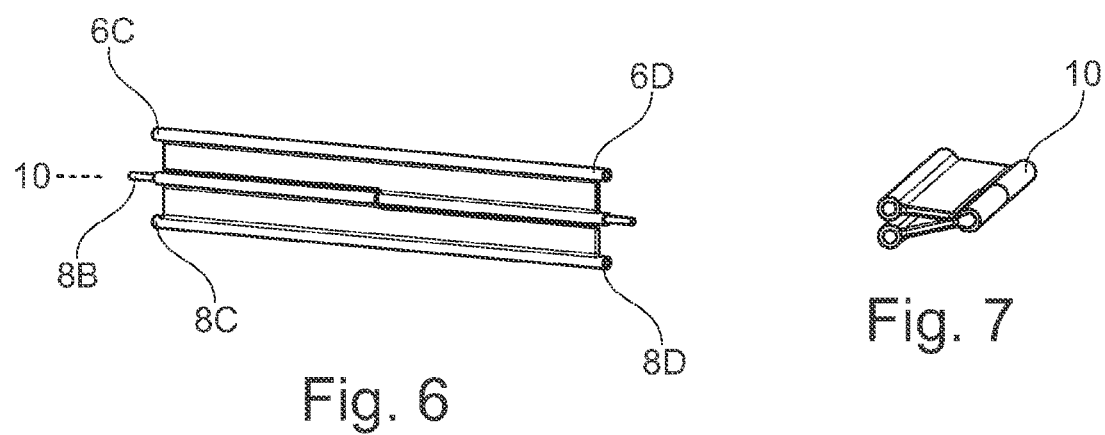
Fig. 6
Fig. 7

AIR GUIDANCE CONTROL UNIT FOR A MOTOR VEHICLE

CROSS-REFERENCE TO RELATED APPLICATIONS

This application is a Section 371 of International Application No. PCT/EP2021/077292, filed Oct. 4, 2021, which was published in the German language on Apr. 7, 2022, under International Publication No. WO 2022/069766 A2, which claims priority under 35 U.S.C. § 119(b) to German Application No. 10 2020 125 891.7, filed Oct. 2, 2020, the disclosures of each of which are incorporated herein by reference.

BACKGROUND OF THE INVENTION

Air flow control having a frame which surrounds at least one air opening for the passage of air flowing along an air flow direction, a closing device comprising adjustable flaps which can be adjusted between an open position letting air pass through the air opening and a closed position at least partially closing the air opening by means of an adjusting device for selectively releasing and closing the air opening for the implementation of thermal management in a motor vehicle unit downstream in the air flow direction, in particular a radiator, for example a water cooler of an internal combustion engine or a cooler for a brake, battery or the like.

All the inventions deal in the broadest sense with a device for the thermal management of a power unit, in particular a device which can be arranged in or behind a frame or a radiator grille of a motor vehicle, preferably at the front end thereof, and wherein, by means of the closure device, the air flow of the airstream defined or spanned by the frame can be regulated by the closure device being able to selectively open or close the at least one air opening in or behind the frame.

Such an air flow control is sometimes referred to as an "active grill shutter" because it is located at the front end of a motor vehicle immediately behind or integrated into a grille or radiator grill of a motor vehicle.

The air opening can thus be selectively closed by the closing device depending on the engine power.

The frame thus spans a frame plane which is circumferentially enclosed by the frame and simultaneously defines the air opening. The air opening can be selectively opened and closed by the closing device depending on the performance of the motor vehicle unit or also to change the air resistance. The air guide control is closed, for example, for faster heating of the engine in the starting phase and is opened under full load for better cooling of the engine.

Roller blind systems with a roller blind that can be wound up and unwound as well as drivable individual flaps are used as closing devices. The roller blind is unwound and wound onto a drivable shaft between the open position wound onto the shaft and the unwound closed position.

Such a roller blind system is known, for example, from DE 10 2017 211 577 A1.

The flaps comprise several flaps arranged rotatably above or next to one another in the frame with a flap longitudinal axis extending transversely to the direction of travel, each flap being accommodated rotatably in the frame and comprising flap surfaces. The flaps can be rotated about their respective longitudinal flap axis from the closed position, in which the flap surfaces extend substantially transversely to the direction of travel, to an open position, in which the flap surface extends wholly or partially parallel to the direction of travel.

Such a flap arrangement is known, for example, from WO 2012/047528 A2 and EP 2 855 185 B1. Prior art of a different kind is disclosed in DE 10 2018 124 572 A1, U.S. Pat. No. 10,202,049 B2, CN 109 969 113 A, CN 209 479 413 U, DE 10 218 218 570 and U.S. Pat. No. 9,827,847.

To regulate the air intake, in known roller blind systems a cover is driven, for example by a cable, so that the openings of the radiator grille can be closed or uncovered. The disadvantage here is that the roll-up runs in one direction and thus requires a longer path to release the air intake.

Further disadvantages can be seen in known roller blind systems where the cover is driven, for example by a cable, in order to close or release the openings of the radiator grille. Cable pulls could be disadvantageous here, since they must run over deflection pulleys and can thus wear out more quickly, can jump out of the guide and the regulation of the cooling can be suspended, thus leading to enormous damage to the vehicle or the engine due to insufficient cooling. This hinders air conditioning of the vehicle with fresh air.

Overall, the systems are quite bulky, making them more difficult to integrate into the confined installation space in modern engines.

It is the task of the invention to at least partially avoid the disadvantages of the prior art and, in particular, to provide a cost-effective, reliable and compact air guidance control system.

SUMMARY OF THE INVENTION

The invention solves this problem by the features of the independent claims. Advantageous but not mandatory features are given in the sub-claims.

A first solution can be described in keyword form as a "triple flap with gate guide". This is characterized by the fact that the flaps comprise a flap arrangement with two part flaps rotatably connected to one another, that each part flap has a flap surface extending along a flap longitudinal axis, which is bounded by part flap longitudinal sides and part flap end sides, that the part flap end sides are designed shorter than the part flap longitudinal sides, so that the partial flaps of the flap arrangement are thus rotatably connected to one another at the partial flap longitudinal sides, in that at the partial flap end faces in each case three pins are formed which project in the direction of the flap longitudinal axis, are spaced apart from one another and extend collinearly with respect to pins formed at the opposite partial flap end face, in that a central pin and two outer pins located on the outer side thereof are formed on each partial flap end face, in that the central pin functions as a drive pin and is formed collinearly with an axis of rotation which rotatably connects the partial flaps to one another on the mutually facing partial flap longitudinal sides, in that the two opposing central pins can be inserted displaceably in horizontal slotted holes of a drive guide which are formed coplanarly (extending in one plane), and in that the outer pins of the two partial flaps can be inserted displaceably in vertical slotted holes which are formed at a rear end of the horizontal slotted holes, as seen in the direction of air flow, so as to extend essentially at a right angle from this respective path.

Simplified, the central pins formed collinearly centrally on the axis of rotation between the part flaps pivotably connected to one another can be used as drive pins or drive domes which are displaced in a first direction, preferably a horizontal direction, extending in the installed position from a front position to a rear position. When these drive pins are displaced in the horizontal oblong holes, the outer pins provided on the outside of the partial flaps, i.e. outer pins formed on the outer partial flap longitudinal sides, are guided in the vertical oblong holes extending at the angle to the horizontal oblong holes, so that the flap arrangement can be adjusted from the forwardly pulled open position, in which the two partial flaps are folded together against each other, into the rearwardly arranged closed position, in which the two partial flaps are folded apart, thus forming an entire flap plane in a plane for closing the air opening.

A second solution, which can be summarized in a keyword-like manner under the keyword "flap arrangement with gearwheel connection", is characterized in that the closure device comprises a flap arrangement with two or more flaps rotatably connected to one another, each flap having a flap surface extending along a flap longitudinal axis, which is delimited or enclosed by flap longitudinal sides and flap end sides delimiting the latter, in that the flap end faces are designed to be shorter than the flap longitudinal sides, in that the flap end faces comprise pins, trunnions or the like formed coaxially with a flap axis of rotation extending along the flap longitudinal axis for rotatable insertion into the frame or a holder, and in that flap toothed wheels arranged around the flap axes of rotation and engaging in one another in the installed position are provided at at least one end face of the flaps.

One of these flap gears is driven by an actuator, preferably an electric motor, so that the flaps can be moved around their respective flap longitudinal axis from the closed position closing the air openings, in which the flap surfaces extend essentially in the plane or parallel to the plane of the air opening, i.e. are arranged extending transversely to the air flow direction, into the open position opening the air opening, in which the flap surfaces extend essentially parallel to the air flow direction, i.e. extend transversely to the surface of the air opening.

A third solution, constituting an invention independent of the two first solutions, can be summarized under the keyword folding flap sliding technology. In this solution, the closure device comprises a flap arrangement with three flaps connected to one another in a rotatable or pivotable manner on the adjacent longitudinal flap sides, namely a center flap and two outer flaps enclosing the latter on the outside.

Preferably, the rotatable/pivotable connection is constructed in the manner of a hinge and comprises a pivot pin on one joining partner and a corresponding bushing for receiving the pivot pin on the corresponding other joining partner.

Each flap of the flap arrangement again has a flap surface extending along a flap longitudinal axis, which is bounded by flap longitudinal sides and flap end sides. The flap ends are preferably shorter than the flap long sides.

The center flap has an axis of rotation extending through the center of the center flap surface, and the pins of the center flap are designed as "rotation pins" or "rotary pins" which extend coaxially to the axis of rotation of the center flap surface and project from the end faces of the center flap. These rotation pins can be driven, preferably via an actuator, which is why they can also be referred to as arrive pins.

By contrast, pins projecting preferably coaxially from the end faces of the outer flaps are guided displaceably in guideways of a joining partner and are therefore referred to as "guide pins". However, these guide pins of the outer flaps do not extend coaxially to the central longitudinal axis of the outer flaps, but are offset outwardly from the central longitudinal axis of the outer flaps, preferably almost completely to the flap longitudinal side, which is designed opposite the longitudinal side for rotatable connection to the adjacent central flap, referred to here as the distal "outer flap longitudinal side". These guide pins of the outer flaps are slidably guided in channel guides of the frame or of a holding arrangement insertable into the frame.

Preferably, in order to realize a particularly harmonious movement, these channel guides are arc-shaped, in particular in the form of an arc segment which extends around the axis of rotation which rotatably connects the adjacent flaps to each other at the flap longitudinal sides.

Thus, on the flap end faces, external pins projecting from the outside are provided at the end of the flap end faces facing away from the common axis of rotation of the flap, which act as guide pins.

The rotary pins of the center flap are designed to be driven by an actuator, in particular an electric motor, and the guide pins of the outer flaps are slidably guided in preferably arcuate link guides of the frame or a holding arrangement that can be inserted into the frame.

If the rotation pins of the center flap are rotated, the rotatable connection of the center flap to the outer flaps on the flap longitudinal sides that can be rotated against each other causes the outer flaps to rotate about this rotational connection with the center flap in the flap longitudinal direction. In the process, the guide pins of the outer flaps are guided by their offset in the complementary link guides in such a way that, depending on the direction of rotation of the center flap, the outer flaps either rest against the center flap (open position) or move away from it (closed position).

According to the invention, one or more frames with flap arrangements can be provided, whereby preferably the flap arrangement for each frame can be controlled individually. Alternatively, several flap arrangements for several frames or several air openings can be controlled simultaneously, e.g. several air openings in a radiator grille via actuator and connected to a coupling element.

The flap arrangements can be inserted directly into the frame or radiator grille comprising several frames, or can be inserted into them. In this respect, the frame does not necessarily have to be present. Rather, it is sufficient that the closure device comprising flaps can be inserted, preferably snapped, into a frame.

Embodiments that can be inserted into the frame or an air opening preferably comprise plate-like end flap holders acting as side bearings, sometimes also referred to as cassette modules, into which the flap ends can be inserted, in particular several flaps louvered over or next to one another, which can then be inserted into the frame or the air openings as an assembly comprising two lateral side bearings and the flap arrangement extending between them.

All solutions can either be formed directly in the frame with the at least one, preferably several air openings, so that one such flap arrangement is arranged in each air opening, so that the flap arrangements in different air openings can also be driven via a common actuator.

In addition, the invention relates to a motor vehicle subassembly comprising a flap arrangement, in particular a radiator grille or a receptacle for the flap arrangement, and a unit arranged downstream of the flap arrangement in an air flow direction, in particular a radiator to which the air flow can be controlled via the flap arrangement, e.g. a radiator for a brake, a battery or an internal combustion engine.

In this respect, the invention also relates to a motor vehicle arrangement/motor vehicle subassembly comprising one or more of the flap arrangements described above for implementing air guidance control through an air opening and a unit around which the air flows in the direction of air flow, in particular a radiator. Preferably, an air conduit, preferably in the form of an air duct, can be provided between the air opening and the unit, which conduit guides the air from the air opening to the unit.

Preferably, the flap arrangements and the motor vehicle arrangement are designed wholly or partly as plastic parts, in particular as plastic injection molded parts that can be produced inexpensively and in high quality in series production.

The frame in which the flap arrangement is arranged can either be of one-piece design or consist of several parts, in particular two half-shells, whereby to simplify assembly the flaps of the flap arrangement are preferably inserted into a first half-shell and then the second half-shell is connected to the first half-shell, preferably non-detachably.

Thus, the invention also relates to a frame comprising the flap arrangement, which can be installed as a component in particular in a front radiator grille for regulating air control or improving air resistance.

Further features and advantages of the present invention will become apparent from the following figure description of preferred embodiments with reference to the accompanying figures.

In this regard, directional terminology such as "top," "bottom," "front," "rear," "front," "rear," etc. is used in reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention. The following detailed description is not to be construed in a limiting sense.

In the context of this description, the terms "connected", "connected" as well as "integrated" are used to describe both a direct and an indirect connection, a direct or indirect connection as well as a direct or indirect integration. In the figures, identical or similar elements are given identical reference signs where appropriate.

The representations in the figures are essentially to scale. However, to illustrate details, certain areas may be shown at an exaggerated size recognizable to those skilled in the art. In addition, the drawings may be strikingly simplified and do not include every detail that may be present in the practical embodiment.

Unless otherwise indicated, the indefinite article and definite article refer not only to a single component, but are to be understood as "at least one". The terminology includes the previously mentioned words, variations thereof, and similar meanings. Further, it should be understood that the terms "about," "substantially," and similar terms used in connection with the dimensions and a property of a component of the invention do not describe the described dimension and property as a strict limit or parameter and do not exclude minor variations thereof which are functionally similar. At a minimum, descriptive parts with numerical parameters also include variations of these parameters according to mathematical and manufacturing principles in the prior art, e.g., rounding, deviations and other systematic errors, manufacturing tolerances, etc.

Finally, in the case of several identical components or elements, for reasons of clarity only one reference sign is given in each case.

BRIEF DESCRIPTION OF THE SEVERAL VIEWS OF THE DRAWINGS

All features of the respective embodiments are also disclosed independently of each other in general within the scope of the invention. Identical reference numerals of the figures refer to identical components or features. It shows:

FIG. 4 an isometric front view of a first partial flap of the flap arrangements according to FIGS. 1-3;

FIG. 5 an isometric front view of the second partial flap of the flap arrangement according to FIGS. 1-3;

FIG. 6 an isometric front view of a flap arrangement according to FIGS. 1 to 3 in the closed position;

FIG. 7 is an isometric front view of a flap according to FIG. 6 in the open position, i.e. in the folded position;

DETAILED DESCRIPTION

Figure 1:
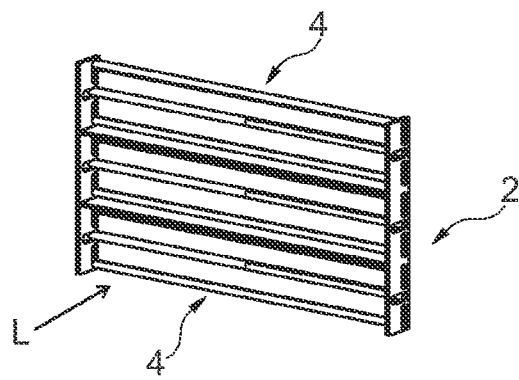
FIG. 1 an isometric front view of the first embodiment (folding flap sliding technique) in the closed position.
Figure 2:
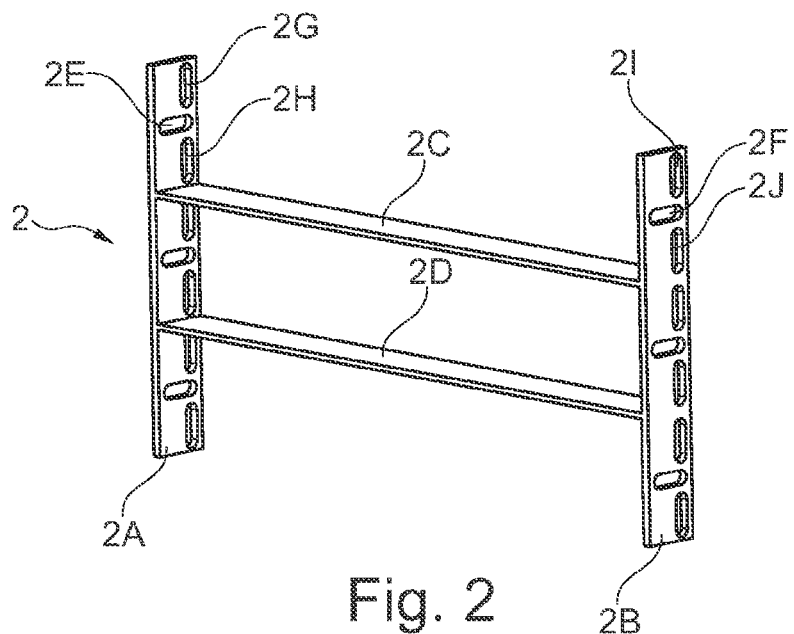
FIG. 2 an isometric view of a frame of the embodiment according to FIG. 1.

FIG. 1 thus shows an isometric view of a closed flap arrangement 4 of the folding flap sliding technology embodiment comprising an H-shaped frame 2, which has two lateral vertical struts 2A, 2B as well as horizontal struts 2C, 2D arranged between these vertical struts 2A, 2B and spacing them apart. In the lateral vertical struts 2A, 2B of the frame 2 are inserted the flap arrangements 4 shown in the FIG. 6 in the closed position comprising two partial flaps 6, 8. In the figure, a total of three flap arrangements 4 arranged one above the other in a louver-like manner are arranged in the frame 2.

Each flap arrangement 4 comprises a first partial flap 6 and a second partial flap 8, which are pivotably connected to one another along a central axis of rotation 10 and for this purpose have two complementary connecting pieces on the mutually facing longitudinal sides of the partial flaps. The upper partial flap 6 has a double pin 6A on the mutually facing inner longitudinal side of the partial flap, extending approximately in half along the longitudinal sides of the partial flap, which pin projects once at the partial flap end face beyond the partial flap end face and has a further pin approximately in the middle of the longitudinal side of the partial flap, which pin can be inserted rotatably into a complementary bearing opening 8A formed on the longitudinal side of the partial flap 8. Extending coaxially with this bearing opening 8A, the partial flap 8 is formed with a central pin 8B at the flap end opposite the bearing opening 8A. The double pin formed on the opposite partial flap end face of the partial flap 6 also functions as such a center pin 6B. On the outer longitudinal sides of the partial flaps 6, 8, which thus face away from the axis of rotation 10, the partial flaps each comprise somewhat shorter outer pins 6C, 6D, 8C, 8D.

In the installed position, the central pins 6B, 8B are seated coplanar in horizontal elongated holes 2E, 2F formed in the vertical struts 2A, 2B, in which these are guided displaceably along the air flow direction L, i.e. longitudinally displaceably. At the same time, the outer pins 6C, 6D, 8C, 8D of each flap arrangement 4 are seated in vertical elongated holes 2G, 2H, 2I, 2J, which are formed in the air flow direction L at the rear end of the horizontal elongated holes 2E, 2F, each extending outwardly at a right angle therefrom. By this embodiment, it is realized that when the center pins 6B, 8B are horizontally displaced by an actuator, that is, a translational movement, the partial flaps 6, 8 of the flap arrangement 4 are opened when pulled forward and closed when pushed backward.

FIG. 1 shows a triple flap arrangement with three flap arrangements 4 one above the other in the closed position.

Figure 3:
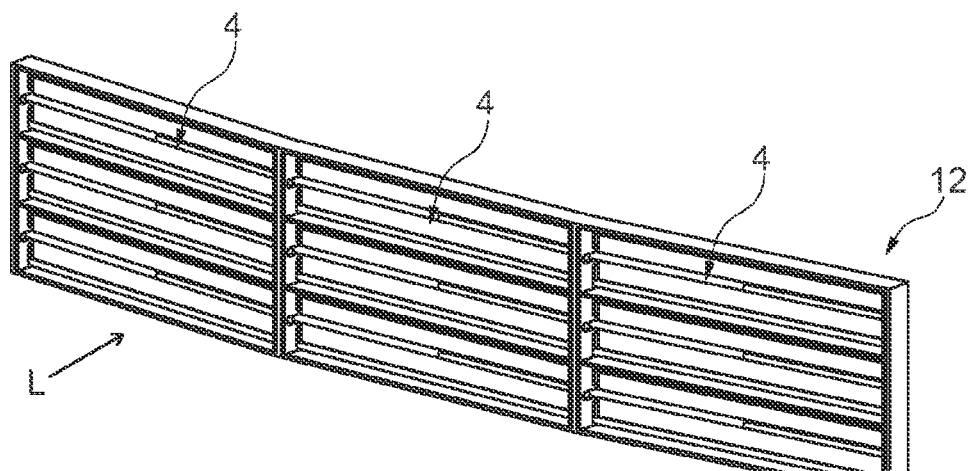
FIG. 3 a modularly extended flap arrangement of the folding flap sliding technology embodiment, comprising three flap arrangements arranged in a common frame.

FIG. 3 shows a modularly extended frame 12 in which three flap arrangements 4 of the embodiment according to FIG. 1, arranged side by side, are inserted.

This frame 12 can be modularly extended in any way in the horizontal and vertical directions. Of course, the embodiment is not limited to two or three flap arrangements 4 on top of each other.

Figure 8:
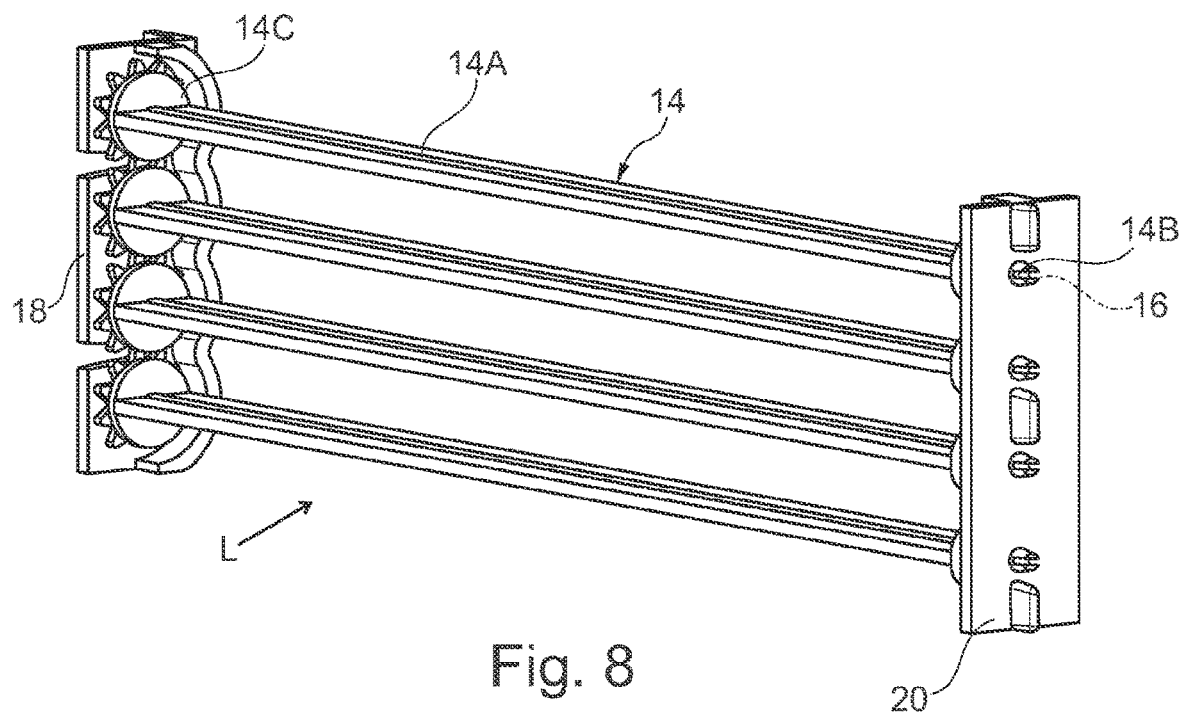
FIG. 8 is anisometric view of a second embodiment of the flap arrangement (flap arrangement with gears)
Figure 9:
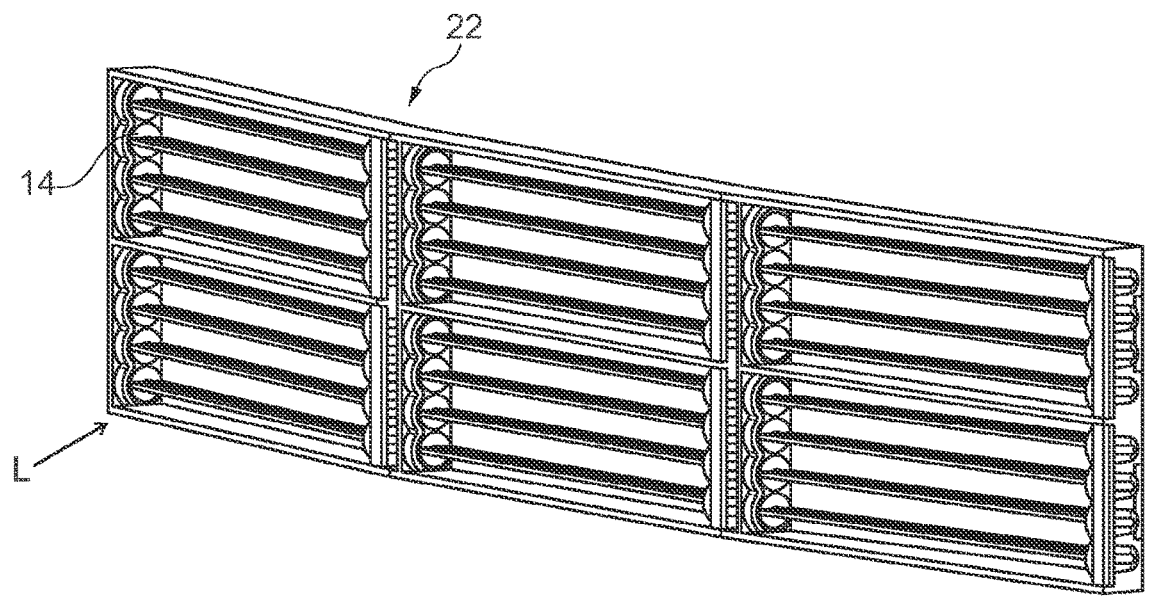
FIG. 9 is an isometric front view of a modular extended flap arrangement with gears according to FIG. 8.

FIGS. 8 and 9 show isometric views of the second embodiment flap arrangement with gears. Again, the flap arrangements comprise four flaps 14, which together form the closure device and which are adjustable between an open position releasing an air opening and a closed position closing the air opening at least partially or completely by means of an adjustment device, in particular an actuator, preferably comprising an electric motor, for selectively releasing and closing the air opening for the thermal management of an internal combustion engine downstream in the air flow direction L.

In the present embodiment, the closure device comprises four flaps 14 in each case, each flap 14 having a flap surface 14A extending along a longitudinal flap axis, which in this case also represents the flap rotation axis 16. This flap surface 14A is bounded by flap longitudinal sides and flap end faces which limit the flap surface 14A, the flap end faces in turn being of substantially shorter design than the flap longitudinal sides, the flaps thus being of elongated, wing-like design.

Rotary pins 14B are formed at each of the flap end faces, coaxially extending with respect to the flap rotation axis 16 of a respective flap 14, and extend outwardly along the flap longitudinal axis at the flap end faces. These rotary pins 14B projecting at the end faces are each inserted in plate-like end flap holders 18, 20 with correspondingly formed openings for the insertion and rotatable reception of the rotary pins 14B.

The end flap holders 18, 20 thus form the flap arrangement together with the four flaps 14. Each flap also has a flap gear wheel 14C at at least one end, which in the installed position, i.e. installed in the frame or in a radiator grille, engages with the adjacent flap gear wheels 14C of the adjacent flaps 14 and thus the adjacent flaps can be moved in opposite directions to one another between the open position shown in FIGS. 8 and 9 and the closed position rotated by 90°. This embodiment offers the advantage of a particularly fast and efficient adjustment in a very compact installation space.

FIG. 9 then shows a frame arrangement comprising a total of eight of the flap arrangements shown in FIG. 8 in an arrangement three flap arrangements wide and two flap arrangements high arranged in a module frame 22

FIGS. 10 to 16 show various views of the third embodiment of the invention in the "triple flap gate guide" embodiment.

Figure 10:
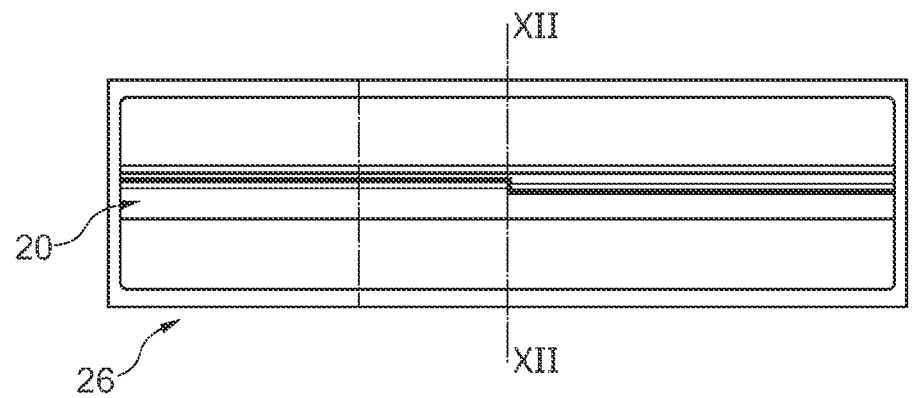
FIG. 10a front view of the third embodiment of the flap arrangement (triple flap gate guide) in the open position.
Figure 14:
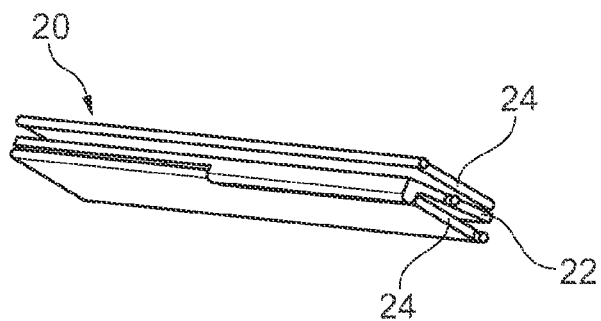
FIG. 14 an isometric view of the flap assembly shown in FIG. 13 in the collapsed open position.
Figure 15:
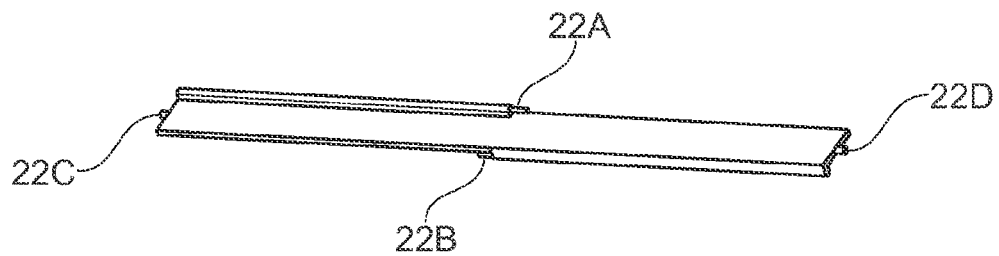
FIG. 15 an isometric view of a center flap of the flap assembly of FIG. 14.
Figure 16:
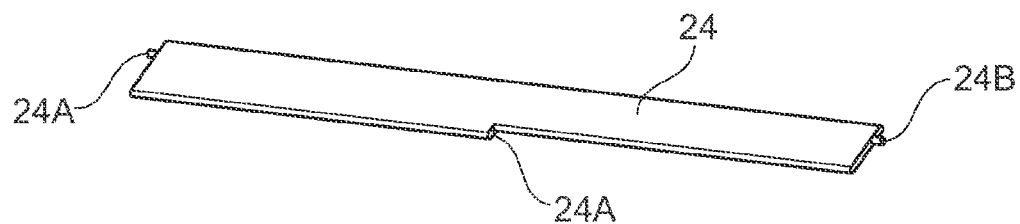
FIG. 16 an isometric view of an outer flap according to the flap arrangement of FIG. 14.

FIG. 10 shows a front view of such a flap arrangement in the open position, in which the center flap 22 and the two outer flaps 24 enclosing it on the outside are folded together, as shown in the isometric view in FIG. 14. The flap arrangement 20 is inserted in a box-like frame 26 accommodating the same. In the present embodiment, the frame 26 accommodates two superimposed flap arrangements 20 and includes two lateral vertical legs 26A, 26B spaced apart by horizontal webs 26C, 26D, 26I.

Each of the flap arrangements 20 comprises a center flap 22 and two outer flaps 24 of the same design rotatably connected to these on the outside at axes of rotation 28, 30.

The center flap 22 is thus connected to the outer flaps 24 in the manner of a hinge, one part of the hinge being formed on the center flap 22 and the corresponding other part on the outer flaps. For this purpose, this central flap 22 and the outer flaps 24 are also formed in a complementary manner on the flap longitudinal sides which lie against one another in the installed position, such that a pin/socket connection is formed for rotatable connection between the parts. Presently, the two longitudinal flap sides of the center flap 22 include two pivot pins 22A, 22B which engage corresponding sockets 24A on the outer flaps 24. Furthermore, correspondingly formed stops can be formed between the flap longitudinal sides, so that a hinge joint is formed between the two adjacent flap longitudinal sides of the center flap 22 and the outer flaps 24, which hinge joint is formed in such a way that the flaps lie as close to each other as possible in the open position shown in FIG. 15.

The center flap 22 further has rotation pins 22C, 22D centrally of the flap ends and along the axis of rotation of the center flap 22, which can be actuated via an actuator, i.e. are designed to be rotatable and actuable, and for this purpose are seated in corresponding drive holes in the vertical legs 26A, 26B of the frame 26. At the outer end of the outer flap 24, i.e. the end facing away from the end of the axis of rotation 28, 30, the flap has guide pins 24A, 24B projecting from the flap ends, which in the installed position are inserted displaceably in correspondingly designed channel guides 26F, 26G of the frame and are guided therein, which are preferably arc-shaped or circular-segment-shaped and thus, during the rotation of the rotation pins 22C, 22D of the center flap 22, realize a lateral guidance of the outer flaps 24 via these guide pins 24A, 24B in the link guides 26F, 26G of the frame 26.

Figure 11:
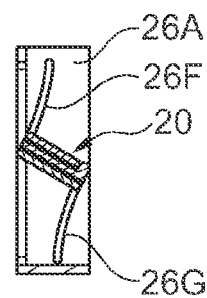
FIG. 11 a cross-section of the flap assembly along line XII-XII as shown in FIG. 10.
Figure 12:
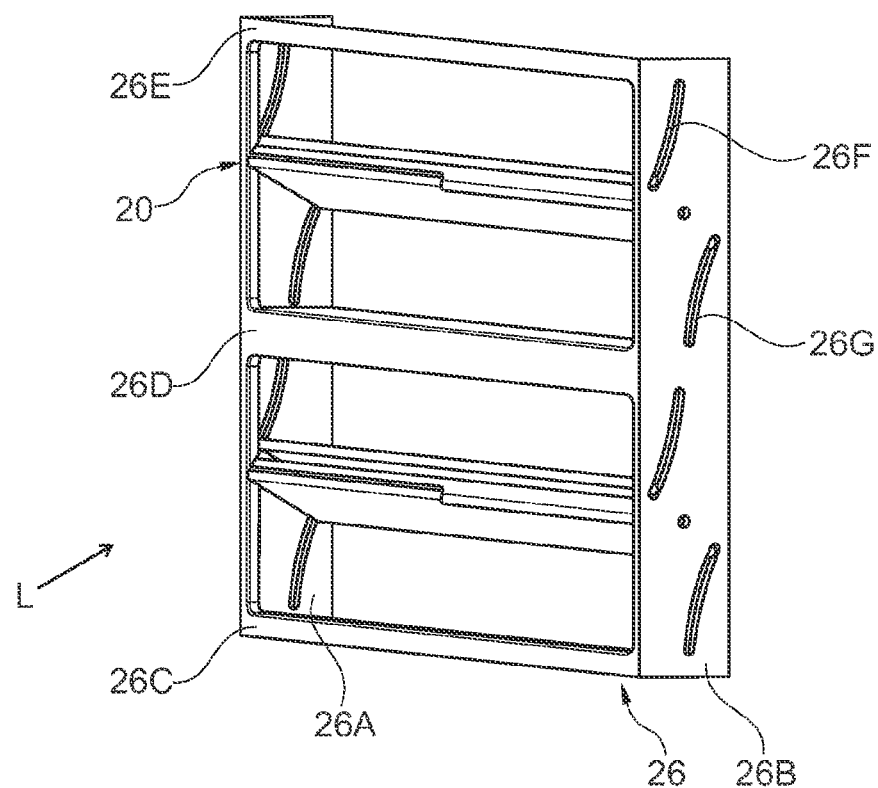
FIG. 12 an isometric front view of two flap assemblies arranged in a common frame according to FIG. 10.
Figure 13:
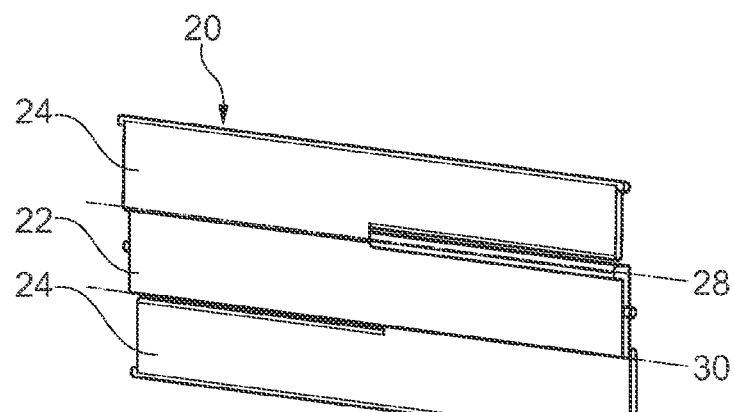
FIG. 13 is an isometric front view of a flap arrangement according to FIG. 10 in closed position without frame.

When the center flap 22 is rotated downward from the open position shown in FIG. 11, i.e., counterclockwise, the outer flap 24 arranged above the center flap 22 is thus guided/folded upward with its distal end facing away from the center flap 22 by the guide of the guide pins 24A, 24B in the upper channel guides 26F. At the same time, the outer flap 24 arranged below the center flap 22 is folded downward with its distal end likewise facing away from the center flap by the guide of the guide pins 24A, 24B in the lower gate guides 26G.

Thus, in the open closed position, a closed flap wall is formed by a central center flap 22 and two outer flaps 24, which in the open open position can be folded together almost to form a common flap, the flap longitudinal side of which then extends as far as possible at right angles to the direction of travel and thus wind direction, in order to provide the lowest possible air resistance.

The subject-matter of the present invention results not only from the subject-matter of the individual patent claims, but also from the combination of the individual patent claims with each other. All details and features disclosed in the documents—including the abstract —, in particular the spatial configuration shown in the drawings, are claimed to be essential to the invention insofar as they are new, individually or in combination, compared to the prior art.

LIST OF REFERENCE SIGNS

L Air flow direction
2 Frame
2A, 2B Vertical braces
2C, 2D Horizontal braces
2E, 2F Horizontal slotted holes
2G, 2H, 2I, 2J Vertical oblong holes
4 Flap arrangement
6 Partial flap
6A Double pin
6B Middle pin
6C, 6D Outer pin
8 Partial flap
8A Bearing opening
8 Middle pin
8C, 8D Outer pin
12 Frame
6B Middle pin
10 Rotational axis
12 Frame
14 Flap
14A Flap area
14B Rotating pin
14C Damper gear
16 Folding rotary axis
18, 20 Face flap holder
22 Module frame
20 Damper arrangements
22 Center flap
22A, 22B Swivel pin
22C, 22D Rotation pen
24 Exterior flaps
24A, 24B Guide pin
24 Socket
26 Frame
26A, 26B Vertical leg
26C, 26D, 26E Horizontal brace
26F, 26G channel guide
28, 30 Rotational axis

The invention claimed is:

1. An air flow control for a vehicle, the air flow control being insertable into an air opening for controlling air flowing along an air flow direction, having a closure device comprising adjustable flaps which can be adjusted between an open position releasing the air opening and a closed position at least partially closing the air opening by an adjustment device for selectively releasing and closing the air opening, wherein each flap comprises a flap surface extending along a flap longitudinal axis, which is delimited by flap longitudinal sides and flap end faces limiting the flap surface, wherein the flap end faces are formed shorter than the flap longitudinal sides and wherein pins are provided at the flap end faces, said pins can be inserted movably into a frame or joining partner and are arranged collinearly, wherein the closure device comprises a flap arrangement with three flaps rotatably connected to each other comprising a centrally arranged center flap and two outer flaps enclosing the center flap, a flap axis of rotation of the center flap extending through a center of the flap surface of the center flap, the pins of the center flap extending as rotation pins coaxially to the flap axis of rotation of the center flap, the center flap being rotatably connected at the flap longitudinal sides with the adjacent flap longitudinal sides of the outer flaps, wherein the pins of the outer flaps are designed as guide pins which project outwardly offset from a center line of the center flap from the flap end faces of the outer flaps, in that the flap rotation axis of the rotation pins are designed to be drivable, wherein the guide pins (24A, 24B) of the outer flaps are displaceably guided in channel guides of the frame or of a holding arrangement insertable into the frame, and wherein a first part of a hinge is formed at the flap longitudinal sides of the center flap and a second part of the hinge engages the first part of the hinge, and the second part of the hinge is formed at a proximal-flap longitudinal side of the outer flap adjacent to the center flap.

2. The air flow control for the vehicle of claim 1, wherein the channel guides are arcuate in shape.

3. The air flow control for the vehicle of claim 1, wherein the hinge comprises a pivot pin and a bushing.

4. The air flow control for the vehicle according to claim 1, wherein the flaps of the flap arrangement are inserted into end flap holders insertable into the frame.

5. The air flow control for the vehicle according to claim 1, wherein it comprises a frame.

6. The air flow control for the vehicle according to claim 5, wherein the frame is part of a radiator grille.

7. The air flow control for the vehicle according to claim 1, wherein it is made of plastic.

8. The air flow control for the vehicle according to claim 1, further comprising a radiator grille.

9. The air flow control for the vehicle according to claim 1, further comprising a radiator, wherein the air flow control regulates an air flow to the radiator.

* * * * *